US005152010A

United States Patent [19]

Talwar

[11] Patent Number: 5,152,010

[45] Date of Patent: Sep. 29, 1992

[54] HIGHLY DIRECTIVE RADIO RECEIVER EMPLOYING RELATIVELY SMALL ANTENNAS

[75] Inventor: Ashok K. Talwar, Westlake Village, Calif.

[73] Assignee: American Nucleonics Corporation, West Lake Village, Calif.

[21] Appl. No.: 458,842

[22] Filed: Dec. 29, 1989

[51] Int. Cl.[5] ........................ H04B 17/02; H04B 7/00

[52] U.S. Cl. .................................... 455/136; 455/273; 455/278.1

[58] Field of Search ............... 455/278, 272, 273, 136, 455/317, 138

[56] References Cited

U.S. PATENT DOCUMENTS

| | | | |
|---|---|---|---|
| 3,694,754 | 9/1972 | Baltzer | 455/287 |
| 3,699,444 | 10/1972 | Ghose et al. | 325/21 |
| 4,275,397 | 6/1981 | Gutleber | 343/100 |
| 4,338,606 | 7/1982 | Tada et al. | 455/277 |
| 4,466,131 | 8/1984 | Ghose et al. | 455/278 |
| 4,593,413 | 6/1986 | Ozaki | 455/139 |

FOREIGN PATENT DOCUMENTS 0193667 10/1986 European Pat. Off. .

OTHER PUBLICATIONS

"Collocation Of Receivers And High-Power Broadcast Transmitters, IEEE Transactions On Broadcasting" vol. 34, No. 2, Jun. 1988.

*Primary Examiner*—Curtis Kuntz
*Assistant Examiner*—Christine K. Belzer
*Attorney, Agent, or Firm*—Hoffmann & Baron

[57] ABSTRACT

A radio receiver having a narrow effective beamwidth includes a receiver antenna, a receiver and a receiver transmission line interconnecting the two, and an interference cancellation system having an auxiliary antenna, a first directional coupler connected to the auxiliary antenna, a second directional coupler connected to the receiver transmission line, a synchronous detector connected to the first and second directional couplers, a signal controller and a subtractor connected to the signal controller and to the receiver transmission line. The receiver antenna is selected to exhibit an omni-directional antenna pattern, while the auxiliary antenna is selected to exhibit a null in its antenna pattern. The null is directed toward the desired signal such that any signals outside of a predetermined angle from the center of the null will be cancelled by the interference cancellation system, and the desired signal which is received within a predetermined angle from the center of the null will be substantially unaffected by the interference cancellation system.

5 Claims, 3 Drawing Sheets

56
52

57

58
52
52

60
60

62

66

64

68

HIGHLY DIRECTIVE RADIO RECEIVER EMPLOYING RELATIVELY SMALL ANTENNAS

CROSS REFERENCE TO RELATED APPLICATIONS

Reference is made to U.S. patent application Ser. No. 07/458,901 entitled "Interference Cancellation System For Interference Signals Having An Arbitrary and Unknown Duration and Direction", by A. Talwar, filed concurrently herewith, the disclosure of which is incorporated herein by reference.

BACKGROUND OF THE INVENTION

1. Field of the Invention

This invention relates to radio communication systems and methods, and more particularly relates to systems and methods for improving the directionality of radio receivers. Even more specifically, this invention relates to an interference cancelling system and method for achieving effectively narrow beamwidth without the use of large antenna systems.

2. Description of the Prior Art

In order for a radio receiver system to achieve high directionality, large antennas or antenna arrays which are either active, i.e., adaptive, or passive, are currently used. For an antenna or a passive antenna array, the half power bandwidth is typically equal to about 50·X/L to about 80·X/L, where X is the wavelength of the radio waves received by the system, and L is the dimension of the antenna in the plane of the beamwidth. Accordingly, the antenna dimensions may become quite large for narrow beamwidths.

Radio receiver systems employing adaptive antenna arrays as well as interference cancellation systems usually require N+1 antennas to cancel N signals without affecting a desired signal. N control loops in the cancellation systems of such radio receiver systems are also required. Accordingly, high directionality is achieved in such conventional radio receivers only with large antennas or antenna arrays.

OBJECTS AND SUMMARY OF THE INVENTION

It is an object of the present invention to provide apparatus and method for improving the directionality of radio receivers.

It is another object of the present invention to provide a highly directive radio receiver employing only two antennas.

It is a further object of the present invention to provide a highly directive radio receiver in which a relatively few number of antennas are used and each antenna is relatively small in dimensions.

It is yet another object of the present invention to provide a radio receiver and interference cancellation system connected to the radio receiver which achieves effectively narrow beamwidth without the use of large antenna systems.

It is yet a further object of the present invention to provide a highly directive radio receiver which overcomes the inherent disadvantages of known radio receivers.

In one form of the present invention, a highly directive radio receiver includes a basic radio receiver system and an interference cancellation system connected to the system. More specifically, the radio receiver system includes a receiver antenna, a receiver and a receiver transmission line connecting the receiver to the receiver antenna. The interference cancellation system includes an auxiliary antenna, a first directional coupler electrically coupled to the auxiliary antenna, and a second directional coupler electrically coupled to the receiver transmission line. The interference cancellation system to which the radio receiver is connected further includes a synchronous detector having at least two inputs which are respectively electrically coupled to outputs of the first and second directional couplers, and a signal controller. The signal controller is electrically coupled to a second output of the first directional coupler, as well as to the outputs of the synchronous detector. Integrators/amplifiers may be interposed and interconnected between the signal controller and the synchronous detector. Furthermore, a variable amplifier may be interposed between the second output of the directional coupler and the signal controller.

The signal controller provides a cancellation signal to a subtractor which is electrically coupled to the receiver transmission line. The subtractor, in effect, injects the cancellation signal into the receiver transmission line to cancel an interfering signal received by the receiver antenna.

The highly directive radio receiver uses an omnidirectional receiver antenna, such as dipole antenna. The auxiliary antenna, on the other hand, is selected such that it exhibits a null in its antenna pattern. An example of such would be a loop antenna (having two nulls in its antenna pattern which are diametrically opposite one another), or one which provides a cardioid pattern (i.e., having a single null). The auxiliary antenna is positioned such that the null of its antenna pattern is directed toward a desired signal source.

The gain in the auxiliary or signal controller path of the interference cancellation system, which path is defined by the auxiliary antenna, amplifier, signal controller and subtractor, is limited such that there is insufficient gain to fully cancel a signal arriving within some angle of the auxiliary antenna null. The signal is either not cancelled or only partially cancelled. If the signal arrives at a null in the antenna pattern of the auxiliary antenna, then there is no signal available in the auxiliary path to cancel the signal in the receiver path defined by the receiver antenna, the receiver and the transmission line. Thus, the signal in the receiver path is unaffected. At small angular deviations from the null of the auxiliary antenna, a small amount of signal is injected into the receiver path, thereby partially cancelling the desired signal.

Partial, not full, cancellation occurs because of the limited gain in the auxiliary path and the low antenna gain in the null of the auxiliary antenna. At larger deviations from the null, the antenna gain of the auxiliary antenna is greater and, accordingly, the gain of the auxiliary path is sufficient to provide adequate signal for cancellation of the signal in the receiver path. The interaction of the interference cancellation system, having an auxiliary antenna which exhibits a null in its antenna pattern and limited gain in the auxiliary path, with the radio receiver employing an omni-directional antenna results in a narrow beamwidth within a predetermined angle about the center of the null.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENTS

Figure 1:
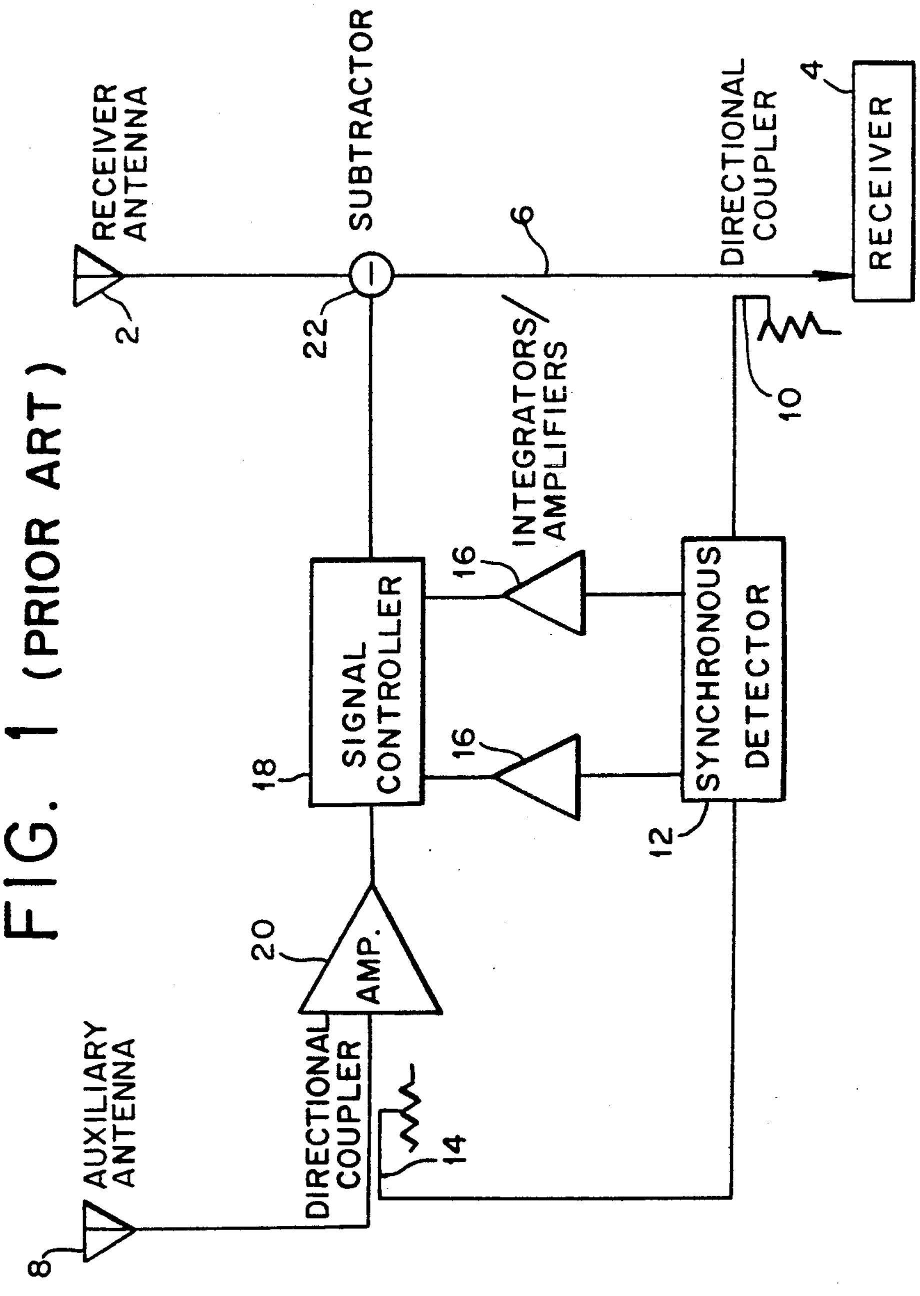
FIG. 1 (PRIOR ART)
FIG. 1 is a functional block diagram of a conventional interference cancellation system connected to a radio receiver system.

FIG. 1 of the drawings illustrates a conventional interference cancellation system connected to a radio receiver system. The radio receiver system basically includes a receiver antenna 2, a receiver 4 and a receiver transmission line 6 interconnecting the receiver antenna 2 and the receiver 4. The receiver antenna 2 may be viewed as receiving both an interfering signal and a desired signal.

The interference cancellation system is designed to cancel the interfering signal from the receiver path defined by the receiver antenna 2, the receiver 4 and the receiver transmission line 6. The interference cancellation system accepts an RF sample of the interfering signal with the help of an auxiliary antenna 8. This reference signal is used to detect the presence, amplitude and phase of this same signal in the receiver path or transmission line 6 between the receiver antenna 2 and the receiver 4.

A directional coupler 10 is electrically coupled to the receiver transmission line 6 to "tap" the receiver transmission line and provide a sample signal. A portion of the reference signal is provided to one input port of a synchronous detector 12 using a directional coupler 14 which is electrically coupled to the auxiliary antenna 8. The other input of the synchronous detector 12 is provided with the sample signal from the directional coupler 10 of the receiver path.

The synchronous detector 12 compares the reference signal with the sample signal, and provides detector output signals which vary in accordance with the differences in amplitude and phase between the reference signal and the sample signal. The synchronous detector is generally a quadrature phase detector having two outputs, Q and I.

Each of the detector output signals may be provided to an integrator/amplifier 16, which will provide time varying, DC control signals which vary in response to the detector output signals. These control signals are provided to a signal controller 18.

The signal controller 18 receives the reference signal through an output of the directional coupler 14 and adjusts the amplitude and phase of the reference signal in response to the control signals it receives from the synchronous detector 12 (via the integrator/amplifier 16). An amplifier 20 may be positioned between the directional coupler 14 and the signal controller 18 to amplify that portion of the reference signal which passes through the directional coupler.

The signal controller 18 provides a cancellation signal which is injected into the receiver path with equal amplitude but in a phase opposite to that of the interfering signal, thereby cancelling the interfering signal from the receiver path. This is accomplished by using another coupler, which is referred to in FIG. 1 as a subtractor 22, which is electrically coupled to the receiver transmission line 6 and to the signal controller 18.

The interference cancellation system automatically and continuously maintains the amplitude and phase of the correction signal for maximum cancellation of the interfering signal from the receiver path. This conventional system is described in detail in co-pending application Ser. No. 07/458,901 entitled "Interference Cancellation System For Interference Signals Having An Arbitrary and Unknown Duration and Direction" filed concurrently herewith, the disclosure of which is incorporated herein by reference.

Figure 2:
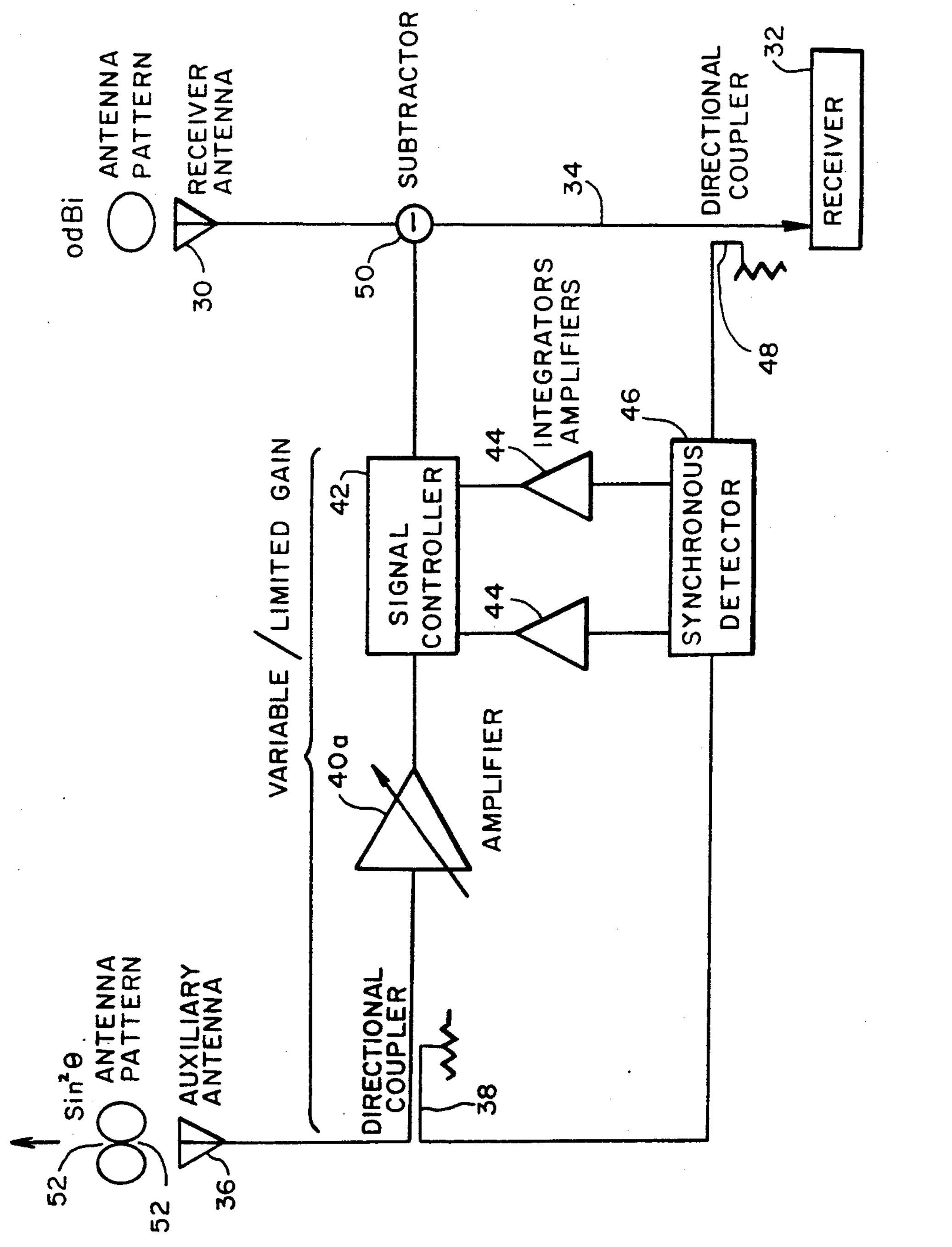
FIG. 2 is a functional block diagram of a radio receiver system and an interference cancellation system formed in accordance with the present invention.

One form of the highly directive radio receiver of the present invention is illustrated by FIG. 2 of the drawings. The radio receiver may be defined as including a radio receiver system and an interference cancellation system connected to it. The radio receiver system and the interference cancellation system of the highly directive radio receiver of the present invention includes many of the components described previously with respect to the conventional interference cancellation system shown functionally in FIG. 1. More specifically, the highly directive radio receiver of the present invention includes a radio receiver portion having a receiver antenna 30, a receiver 32 and a receiver transmission line 34 interconnecting the receiver antenna 30 and the receiver 32; and an interference cancellation system having an auxiliary antenna 36, a first directional coupler 38, an amplifier 40*a*, a signal controller 42, integrators/amplifiers 44, a synchronous detector 46, a second directional coupler 48, and a subtractor 50, all of which are connected in the manner described previously with respect to FIG. 1 and the conventional system.

However, the highly directive radio receiver of the present invention preferably includes a receiver antenna 30 which is of the omni-directional type, such as a dipole antenna. The auxiliary antenna 36 of the present invention is selected to exhibit at least one null 52 in its antenna pattern. The centerline of the null 52 is directed toward the source of a desired signal (i.e., a signal which is desired to be received).

In addition, the gain of the auxiliary path or signal controller path, that is, from the auxiliary antenna 36, through the directional coupler 38, amplifier 40A, signal controller 42 and to the subtractor 50, is limited within a particular angle from the center of the null 52 of the auxiliary antenna such that there is insufficient gain to fully cancel a signal arriving within some angle of the auxiliary antenna null. The signal is either not cancelled or is only partially cancelled. If the signal arrives at a null of the auxiliary antenna 36, then there is no signal available in the auxiliary path of the interference cancellation system to cancel the desired signal in the receiver path. The signal in the receiver path remains substantially unaffected.

At small angular deviations from the null 52 in the auxiliary antenna pattern, a small amount of the cancellation signal is injected into the receiver path, thereby partially cancelling the signal. Partial, not full, cancellation occurs because of the limited gain in the auxiliary path of the interference cancellation system and the low antenna gain of the auxiliary antenna 36.

At larger deviations from the center of the null 52, the antenna gain of the auxiliary antenna 36 is greater and the auxiliary path gain is sufficient to provide adequate signal for cancellation of the signal in the receiver path. Accordingly, the radio receiver, even with an omni-directional receiver antenna 30, becomes, effectively, highly directional. The effective beamwidth of the radio receiver may be controlled by using a variable amplifier 40*a* in the auxiliary path to vary the gain of the auxiliary path. Alternatively, a variable attenuator or other means may be used in the auxiliary path to control the gain.

To facilitate an understanding of how the present invention provides a highly directive effective receiver antenna pattern, the following computations are provided for the case where a loop antenna is used as the auxiliary antenna 36.

It is well known that the gain of a loop antenna is proportional to $\mathrm{Sin}^2\theta$. The antenna pattern for a loop antenna is illustrated by FIG. 2 adjacent to the auxiliary antenna, and again by FIG. 3B. The antenna pattern exhibits two nulls 52—one null being near $\theta=0$ degrees and the other null being near $\theta=180$ degrees—diametrically such that the two nulls are diametrically opposite one another. The gain of the auxiliary antenna 36 in the angular vicinity of these nulls is tabulated in Table I.

TABLE I

| Angle (in degrees) | Relative Gain (in dB) |
|---|---|
| 0 +/−1 or 180 +/−1 | −35.2 |
| 0 +/−2 or 180 +/−2 | −29.1 |
| 0 +/−3 or 180 +/−3 | −25.6 |
| 0 +/−4 or 180 +/−4 | −23.1 |
| 0 +/−5 or 180 +/−5 | −21.2 |
| 0 +/−6 or 180 +/−6 | −19.6 |
| 0 +/−7 or 180 +/−7 | −18.3 |
| 0 +/−8 or 180 +/−8 | −17.1 |
| 0 +/−9 or 180 +/−9 | −16.1 |
| 0 +/−10 or 180 +/−10 | −15.2 |
| 0 +/−11 or 180 +/−11 | −14.4 |
| 0 +/−12 or 180 +/−12 | −13.6 |

The gain of the omni-directional receiver antenna 30 is assumed to be unity (i.e., 0 dB), and the gain of the auxiliary antenna is assumed to be represented by $\mathrm{Sin}^2\theta$ as shown in Table I. Generally, the values of gain of the auxiliary antenna 36 will not be exactly as indicated above but will be proportional to the assume values set forth in Table I, but such deviations will only modify the auxiliary path gain values by a constant multiplier without affecting the final result.

As stated previously, cancellation of a signal in the receiver path will vary as a function of angle from the center of the null 52 for different gains in the auxiliary path of the interference cancellation system. For an omni-directional receiver antenna, the effective cancellation in the receiver path of a radio receiver system, as illustrated by FIG. 2, as a function of angle for different auxiliary path gains is provided in Table II.

TABLE II

| Angle (in degrees) | Cancellation or system response for gain = 25 dB | 20 dB | 15 dB |
|---|---|---|---|
| 0 +/−1 or 180 +/−1 | −3.2 | −1.7 | −0.9 |
| 0 +/−2 or 180 +/−2 | −8.4 | −3.7 | −1.9 |
| 0 +/−3 or 180 +/−3 | −23.2 | −6.4 | −3.0 |
| 0 +/−4 or 180 +/−4 | effectively full | −10.4 | −4.3 |
| 0 +/−5 or 180 +/−5 | effectively full | −17.9 | −5.9 |
| 0 +/−6 or 180 +/−6 | effectively full | effectively full | −7.7 |
| 0 +/−7 or 180 +/−7 | effectively full | effectively full | −10.2 |
| 0 +/−8 or 180 +/−8 | effectively full | effectively full | −13.4 |
| 0 +/−9 or 180 +/−9 | effectively full | effectively full | −18.5 |
| 0 +/−10 or 180 +/−10 | effectively full | effectively full | −32.9 |
| 0 +/−11 or 180 +/−11 | effectively full | effectively full | effectively full |

The calculations of Table II are made by determining the maximum voltage available in the auxiliary path at the point of subtraction (i.e., at the subtractor 50) in relation to the voltage in the receiver path before subtraction. The computations for three different auxiliary path gains are provided in Table II.

It can be seen from Table II that, at angles of 0 and 180 degrees (i.e., the centers of the auxiliary antenna nulls 52), the signal is not cancelled since it is not received by the auxiliary antenna 36 (i.e., the gain of the auxiliary antenna is so low that the signal is effectively not received). At small angular deviations from these angles, the signal is partially cancelled, since a small but insufficient amount of the signal is injected into the receiver transmission line 34 or receiver path.

At larger deviations from the centers of the nulls, the signal is fully cancelled. In practice, "full" cancellation may be limited to about 60 dB due to noise or other factors.

It can further be seen from Table II that the half power (i.e., 3 dB) beamwidth is about 2 degrees for an auxiliary path gain of 25 dB; about 4 degrees for an auxiliary path gain of 20 dB; and about 6 degrees for an auxiliary path gain of 15 dB. By adjusting the gain of the auxiliary path by using the variable amplifier 48, the effective beamwidth of the radio receiver may be controlled.

Significant reductions in antenna size are achieved by the radio receiver of the present invention. The half power beamwidth of an antenna is typically given by 60·X/L. For example, the dimensions of an antenna required for a 2 degree beamwidth at 150 MHz is 60 meters. For a 4 degree beamwidth, the dimensions are 30 meters, and for a 6 degree beamwidth, the dimensions are 20 meters. By comparison, the loop antenna used in the present invention at 150 MHz may have a typical diameter of about 4 inches. A dipole antenna, which may be used for the receiver antenna 30, will be even smaller in the plane of the narrow beamwidth, though somewhat larger in a perpendicular direction.

If narrow beamwidth is desired in the horizontal axis, then the omni-directional receiver antenna 30 and the auxiliary antenna 36 (having a null 52 in its antenna pattern) may be coaxially mounted, that is, such that their phase centers are on the same vertical axis or close to each other for maximum cancellation of other signals arriving at angles away from the null.

The radio receiver of the present invention can cancel several signals simultaneously when their directions are not near the null 52 of the auxiliary antenna 36, while at the same time leaving a signal received in the null direction unaffecfed. Table III illustrates one example of multiple signals arriving at angles away from the null in the auxiliary antenna and sets forth the calculations which have been conducted to estimate the effect of the radio receiver of the present invention in cancelling the multiple signals.

TABLE III

| | Signal 1 | Signal 2 | Signal 3 | Signal 4 | Signal 5 | Signal 6 |
|---|---|---|---|---|---|---|
| Receiver Power Level of Signal | 6.0 | 4.0 | 11.0 | 8.0 | 2.0 | 3.0 |
| | (total power level at receiver antenna = 14.62 dbm) | | | | | |
| Auxiliary Power Level of Signal | 5.7 | 3.9 | 10.7 | 7.5 | 1.1 | 1.7 |
| Angle of Arrival | 76 | 81 | 105 | 110 | 115 | 120 |
| K = 1.048620 | | VQ = 0.0000 | | VI = 0.0000 | | |
| Amount of Cancellation | −36.2 | −26.9 | −36.2 | −37.4 | −24.4 | −18.9 |
| | (sum total of cancellation = −28.4 dB) | | | | | |

In Table III, six signals are shown as arriving from different directions, and each signal has a different magnitude at the receiver antenna 30. In this example, the auxiliary antenna 36 is assumed to be a loop antenna (exhibiting two nulls). Although zero separation between the auxiliary and the receiver antennas is preferred, a separation of 0.1 wavelengths has been assumed to account for any phase errors in the system.

The angles of arrival of the signals set forth in Table III are relative to a null 52 of the auxiliary antenna 36, and the angle of arrival of a signal of interest is assumed to be 0 degrees. This signal is not shown in Table III, as it is unaffected by the radio receiver.

In the example shown in Table III, the auxiliary antenna 36 is assumed to be a loop antenna (having two nulls). Thus, its gain is governed by $\sin^2\theta$. The receiver antenna 30 is assumed to be omni-directional and, accordingly, has unity gain (i.e., 0 dB gain).

Row A in Table III sets forth the various power levels of the six signals at the receiver antenna 30 measured in dbm. The total power at the receiver antenna in dbm is 14.62.

Row B in Table III sets forth the power levels of the six signals at the auxiliary antenna 36 in dbm. These power levels are calculated using the $\sin^2\theta$ equation for the gain of a loop antenna.

Row C of Table III sets forth the relative angles of arrival of the six signals from the center of the null 52 of the auxiliary antenna, which nulls are assumed to be at 0 degrees and 180 degrees.

Row D of Table III sets forth the magnitude of K, which is the voltage gain of the auxiliary path, as well as the values of VQ and VI, which are the steady state Q and I detector output voltages. In the example set forth in Table III, the VQ and VI outputs are set to zero, and the value of K is the gain in the auxiliary path which is necessary to bring about cancellation of the six signals. Typically, K will be greater than one, as the gain of the auxiliary loop antenna is typically less than unity, but is less than a predetermined maximum gain which is selected to provide the effective beamwidth which is desired. The Q and I detector output voltages would each be zero, as would be required by the closed loop of the cancellation system.

Row E of Table III sets forth the amount of cancellation in dB of each of the signals in the receiver path, measured at the receiver (i.e., after the subtractor 50). For example, the first signal (the 6 dbm signal received at 76°) would be diminished by 36 dB at the receiver due to the effect of the cancellation system. Accordingly, the power of the first signal at the receiver is now reduced to −30 dB.

Also shown in Row E of Table III is the sum total of the cancellation effect, which is the ratio of the total signal power before cancellation to the total signal power after cancellation. This value indicates that the overall signal power is reduced by 28 dB.

Figures 3A, 3B, 3C, 3D, 3E, 3F, 3G, 3H:
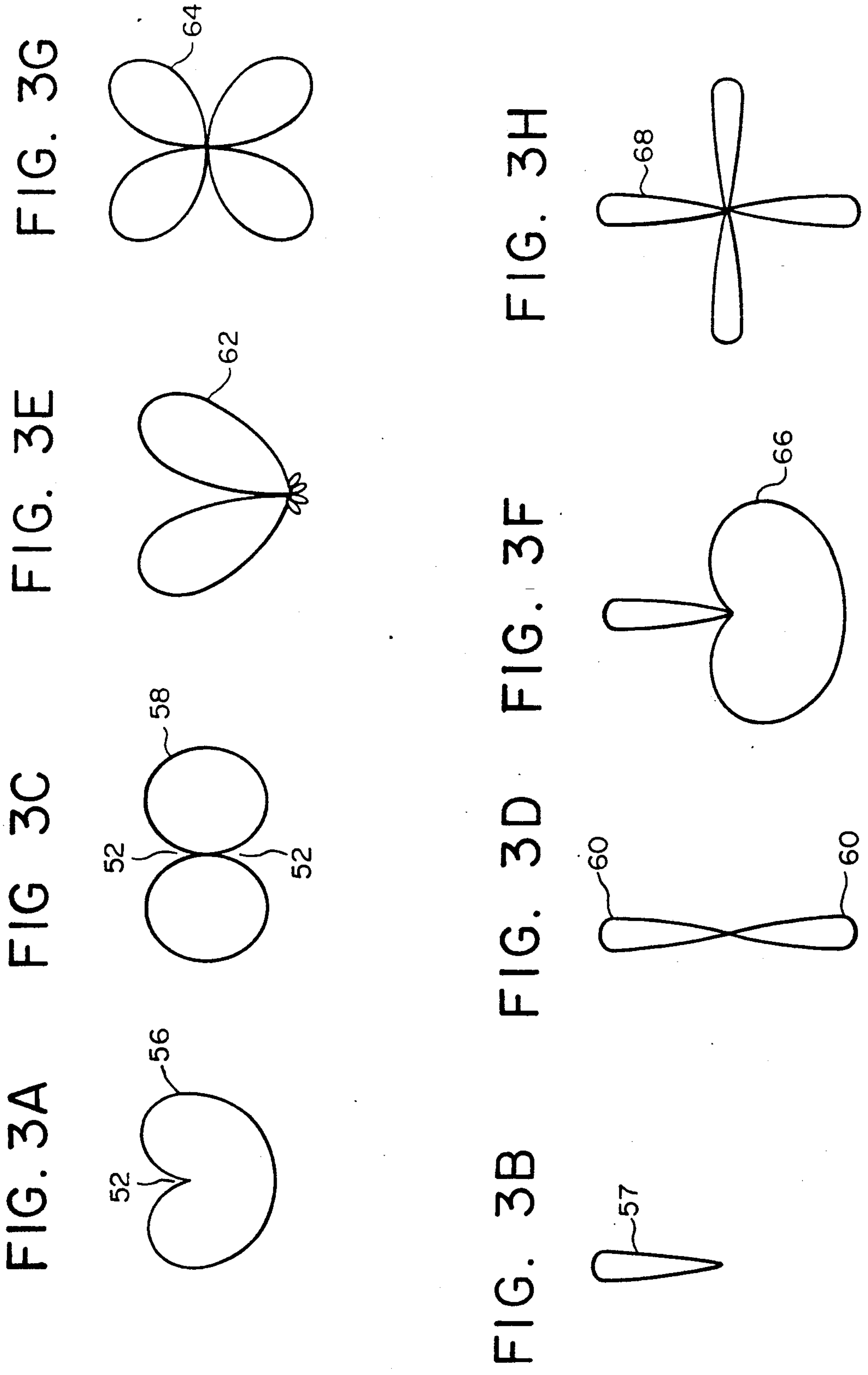
FIGS. 3A and 3B are antenna patterns for various antennas used in the radio, receiver system and interference cancellation system of the present invention.
FIGS. 3C and 3D are antenna patterns for various antennas used in the radio receiver system and interference cancellation system of the present invention.
FIGS. 3E and 3F are antenna patterns for various antennas used in the radio receiver system and interference cancellation system of the present invention.
FIGS. 3G and 3H are antenna patterns for various antennas used in the radio receiver system and interference cancellation system of the present invention.

FIGS. 3A–3H diagrammatically show various antenna patterns for the auxiliary antenna 36 and the resultant effective antenna pattern for the radio receiver. More specifically FIG. 3A is a cardioid pattern 56 which is provided by the auxiliary antenna. It is seen that the cardioid pattern 56 has a single null 52. This null is directed toward the desired signal. As shown in FIG. 3B, the resultant antenna pattern 57 for the radio receiver, using a receiver antenna 30 having an omni-directional antenna pattern, is a highly directive beam whose 3 dB beamwidth is determined by the gain of the auxiliary path through the interference cancellation system.

Similarly, FIG. 3C is the antenna pattern 58 provided by a loop antenna, which pattern 58 exhibits two nulls 52 which are diametrically opposite one another. Using an omni-directional antenna for the receiver antenna, the resultant pattern for the radio receiver is shown in FIG. 3D, which consists of two narrow beams 60 in opposite directions. Although a loop antenna is described herein as being used as the auxiliary antenna, any type of antenna which provides a "Figure 8" antenna pattern, such as a two element end fire array or a two element broadside array, is suitable for use.

FIGS. 3E and 3G illustrate different antenna patterns 62,64 for auxiliary antennas comprising one or more radiators spaced apart from each other, and FIGS. 3F and 3H respectively represent the effective antenna pattern 66,68 of the radio receiver having an omni-directional receiver antenna when used in conjunction with the auxiliary antennas having patterns shown in FIGS. 3E and 3G.

It can be seen from FIGS. 3A–3H that the effective antenna pattern of the radio receiver of the present invention will be substantially the complement of the auxiliary antenna pattern when an omni-directional antenna is used as the receiver antenna. This complementary effective antenna pattern is provided by using only two antennas, each of which is relatively small.

It thus can be seen that a highly directive radio receiver which can cancel signals received outside of a narrow beamwidth and leave a desired signal received within the beamwidth unaffected may be formed by using only two antennas, one being an omni-directional antenna used as the receiver antenna, and the other being an antenna exhibiting a null, which antenna is used as an auxiliary antenna of an interference cancellation system connected to the radio receiver. By controlling the gain of the auxiliary path through the interference cancellation system, the effective beamwidth of the radio receiver may be controlled. In prior techniques employing adaptive array cancellers, as many as six control loops (i.e., the circuit within the interference cancellation system comprising the synchronous detector and the system controller) and a relatively large antenna array consisting of seven antennas would be required to accomplish cancellation of six signals. Table III described previously shows that power reduction or full cancellation may be obtained for six signals arriving at angles which are different from the direction of the null by using only two antennas.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A narrow beamwidth radio receiver, which comprises:
- a receiver antenna, the receiver antenna being of the omni-directional type;
- a receiver;
- a receiver transmission line electrically coupling the receiver antenna to the receiver;
- an auxiliary antenna, the auxiliary antenna having at least one null in the auxiliary antenna pattern;
- a first directional coupler electrically coupled to the auxiliary antenna;
- a second directional coupler electrically coupled to the receiver transmission line;
- a synchronous detector electrically coupled to the first and second directional couplers, the first directional coupler providing a portion of a reference signal to the synchronous detector, and the second directional coupler providing a sample signal to the synchronous detector, the synchronous detector comparing the reference signal with the sample signal and providing at least one detector output signal in response to the comparison thereof;
- at least one integrator/amplifier, the integrator/amplifier providing a control signal in response to the detector output signal;
- variable amplification means, the variable amplification means being electrically coupled to the first directional coupler and providing a variably amplified reference signal in response to the reference signal provided by the first directional coupler;
- a signal controller, the signal controller being electrically coupled to the variable amplification means and to the integrator/amplifier and providing a cancellation signal in response to the amplified reference signal and the control signal; and
- a subtractor, the subtractor being electrically coupled to the signal controller and to the receiver transmission line and effectively injecting the cancellation signal into the receiver transmission line for reducing the power of any signals received outside of a predetermined angle from the center of the null of the auxiliary antenna to effectively provide the radio receiver with a narrow beamwidth;
- the variable amplification means being adjustable in gain to vary and control the effective beamwidth of the radio receiver.

2. A narrow beamwidth radio receiver, which comprises:
- a receiver antenna, the receiver antenna being of the omni-directional type;
- a receiver;
- a receiver transmission line electrically coupling the receiver antenna to the receiver;
- an auxiliary antenna, the auxiliary antenna having at least one null in the auxiliary antenna pattern, the auxiliary
- antenna being selected to provide a Figure 8 antenna pattern;
- a first directional coupler electrically coupled to the auxiliary antenna;
- a second directional coupler electrically coupled to the receiver transmission line;
- a synchronous detector electrically coupled to the first and second directional couplers, the first directional coupler providing a portion of a reference signal to the synchronous detector, and the second directional coupler providing a sample signal to the synchronous detector, the synchronous detector comparing the reference signal with the sample signal and providing at least one detector output signal in response to the comparison thereof;
- at least one integrator/amplifier, the integrator/amplifier providing a control signal in response to the detector output signal;
- variable amplification means, the variable amplification means being electrically coupled to the first directional coupler and providing a variably amplified reference signal in response to the reference signal provided by the first directional coupler;
- a signal controller, the signal controller being electrically coupled to the variable amplification means and to the integrator/amplifier and providing a cancellation signal in response to the amplified reference signal and the control signal; and
- a subtractor, the subtractor being electrically coupled to the signal controller and to the receiver transmission line and effectively injecting the cancellation signal into the receiver transmission line for reducing the power of any signals received outside of a predetermined angle from the center of the null of the auxiliary antenna to effectively provide the radio receiver with a narrow beamwidth;
- the variable amplification means being adjustable in gain to vary and control the effective beamwidth of the radio receiver.

3. A arrow beamwidth radio receiver, which comprises:
- a receiver antenna, the receiver antenna being of the omni-directional type;
- a receiver;
- a receiver transmission line electrically coupling the receiver antenna to the receiver;
- an auxiliary antenna, the auxiliary antenna having at least one null in the auxiliary antenna pattern, the receiver antenna and the auxiliary antenna being coaxially mounted;
- a first directional coupler electrically coupled to the auxiliary antenna;
- a second directional coupler electrically coupled to the receiver transmission line;
- a synchronous detector electrically coupled to the first and second directional couplers, the first directional coupler providing a portion of a reference signal to the synchronous detector, and the second directional coupler providing a sample signal to the synchronous detector, the synchronous detector comparing the reference signal with the sample signal and providing at least one detector output signal in response to the comparison thereof;

at least one integrator/amplifier, the integrator/amplifier providing a control signal in response to the detector output signal;

variable amplification means, the variable amplification means being electrically coupled to the first directional coupler and providing a variably amplified reference signal in response to the reference signal provided by the first directional coupler;

a signal controller, the signal controller being electrically couple to the variable amplification means and to the integrator/amplifier and providing a cancellation signal in response to the amplified reference signal and the control signal; and a subtractor the subtractor being electrically coupled to the signal controller and to the receiver transmission line and effectively injecting the cancellation signal into the receiver transmission line for reducing the power of any signals received outside of a predetermined angle form the center of the null of the auxiliary antenna to effectively provide the radio receiver with a narrow beamwidth;

the variable amplification means being adjustable in gain to vary and control the effective beamwidth of the radio receiver.

4. A narrow beamwidth radio receiver, which comprises:

a receiver antenna, the receiver antenna being of the omni-directional type;

a receive;

a receiver transmission line electrically coupling the receiver antenna to the receiver;

an auxiliary antenna, the auxiliary antenna having at least one null in the auxiliary antenna pattern, the auxiliary antenna being selected to provide a cardioid antenna pattern;

a first directional coupler electrically coupled to the auxiliary antenna;

a second directional coupler electrically coupled to the receiver transmission line;

a synchronous detector electrically coupled to the first and second directional couplers, the first directional coupler providing a portion of a reference signal to the synchronous detector, and the second directional coupler providing a sample signal to the synchronous detector, the synchronous detector comparing the reference signal with the sample signal and providing at least one detector output signal in response to the comparison thereof;

at least one integrator/amplifier, the integrator/amplifier providing a control signal in response to the detector output signal;

variable amplification means, the variable amplification means being electrically coupled to the first directional coupler and providing a variably amplified reference signal in response to the reference signal provided by the first directional coupler;

a signal controller, the signal controller being electrically coupled to the variable amplification means and to the integrator/amplifier and providing a cancellation signal in response to the amplified reference signal and the control signal; and a subtractor, the subtractor being electrically coupled to the signal controller and to the receiver transmission line and effectively injecting the cancellation signal into the receiver transmission line for reducing the power of any signals received outside of a predetermined angle from the center of the null of the auxiliary antenna to effectively provide the radio receiver with a narrow beamwidth;

the variable amplification means being adjustable in gain to vary and control the effective beamwidth of the radio receiver.

5. A method for cancelling multiple signal sin a radio receiver having a receiver antenna, a receiver and a receiver transmission line electrically coupling the receiver antenna to the receiver, the receiver antenna being of the omni-directional type, which comprises the steps of:

connecting an interference cancellation system to the radio receiver, the interference cancellation system including an auxiliary antenna, a first directional coupler electrically coupled to the auxiliary antenna and having at least two outputs, variable amplification means having an adjustable gain electrically coupled to one of the outputs of the first directional coupler, a second directional coupler electrically coupled to the receiver transmission line, a synchronous detector electrically coupled to the other output of the first directional coupler and to the second directional coupler, an integrator/amplifier electrically coupled to the synchronous detector, a signal controller electrically coupled to the integrator/amplifier and to the variable amplification means, and a subtractor, electrically coupled to the signal controller and to the receiver transmission line;

selecting the auxiliary antenna to be one which exhibits at least one null in the auxiliary antenna pattern;

positioning the auxiliary antenna such that the null is directed toward a desired signal, wherein the desired signal is received by the radio receiver and is substantially unaffected by the interference cancellation system, and the multiple signals received outside of said predetermined angle from the center of the null are reduced in power prior to being received by the receiver; and adjusting the gain of the variable amplification means to vary and control the effective beamwidth of the radio receiver.

* * * * *